J. P. BALL.
SEWAGE PURIFIER.
APPLICATION FILED NOV. 21, 1917.
1,371,406.
Patented Mar. 15, 1921.
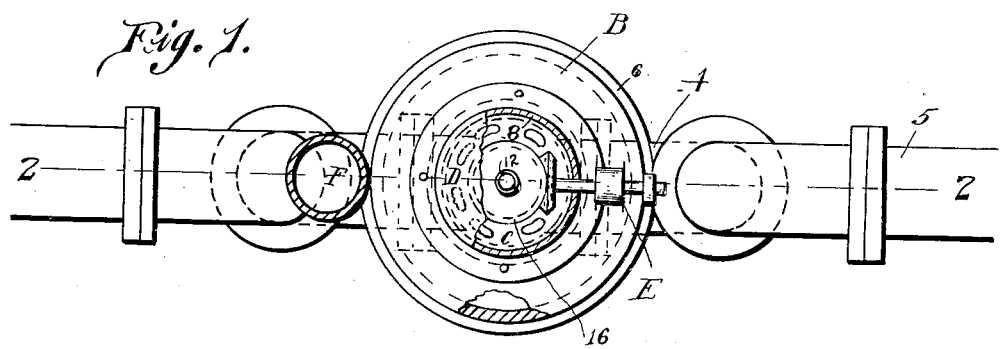
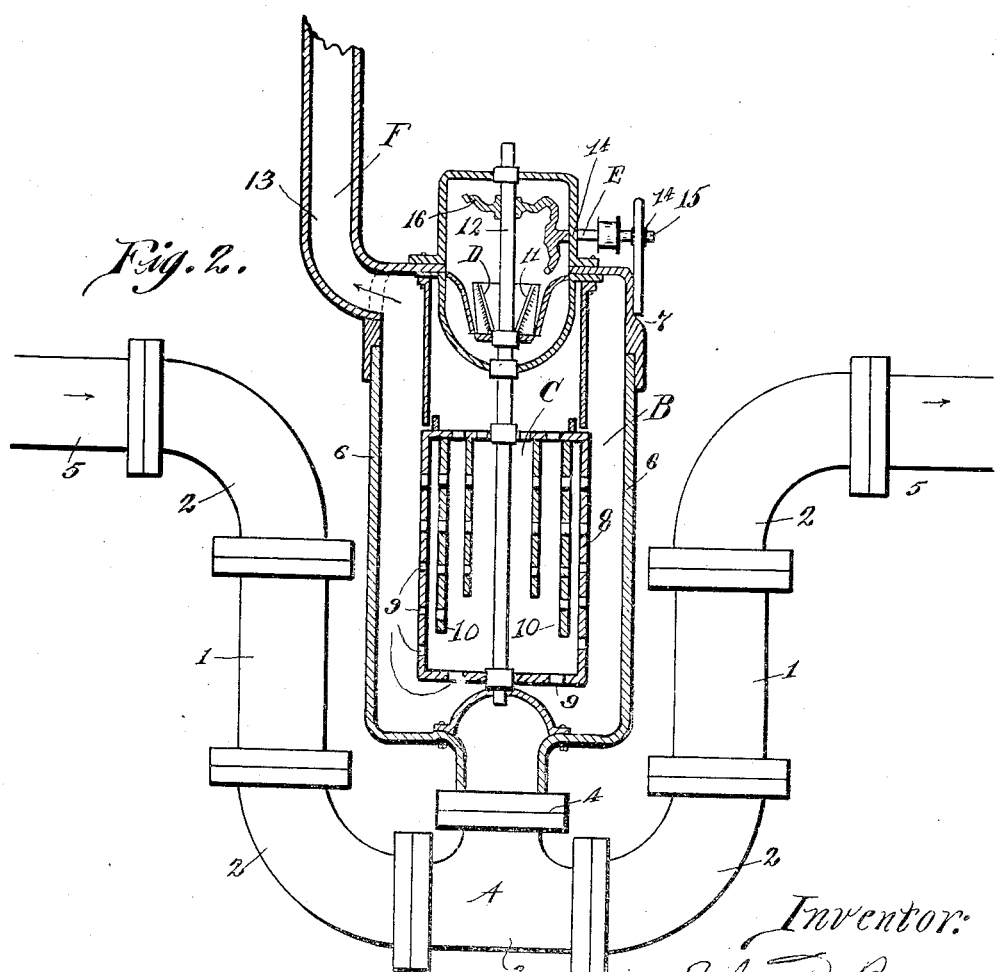

UNITED STATES PATENT OFFICE.

JOHN P. BALL, OF CHICAGO, ILLINOIS.

SEWAGE-PURIFIER.

1,371,406.

Specification of Letters Patent.   Patented Mar. 15, 1921.

Application filed November 21, 1917.   Serial No. 203,280.

*To all whom it may concern:*

Be it known that I, JOHN P. BALL, a citizen of the United States, and a resident of Chicago, in the county of Cook and State of Illinois, have invented a new and useful Improvement in Sewage-Purifiers, construction of which the following is a specification.

My invention relates to means adapted for the purpose of deodorizing and purifying sewage, trade wastes and the like; having for its object the provision of a construction wherein a chamber or tank is provided for the reception of the sewage; with means in said chamber or tank for mechanically agitating the sewage so as to free the noxious gases which are to be discharged through a suitable vent or flue from the chamber or tank to a predetermined point.

A further object of my invention is to provide a construction whereby a current of fresh air will be forced into the chamber or tank and so discharged that it will filter or pass through the agitated sewage, thus inducing an oxidation of the sewage and a positive freeing of the foul gases which will be caused to flow out through the vent or flue; the agitating means, as well as the air current-producing means being mechanically operable and controllable from the exterior of the construction.

The invention and its object will be more fully comprehended from the following detailed description of the accompanying drawings which form a part of my specification wherein:—

Figure 1 is a plan view, partially in section, of my improved construction.

Fig. 2 is a partial side and partial vertical sectional view, taken approximately on the line 2—2 of Fig. 1.

My invention in its general application, contemplates a sewage line which is constructed so as to provide a sump section, as at A, with which a chamber or tank, as at B, is adapted to be in communication at the bottom of the tank and at the lowest point of the sump section so as to permit the sewage to rise within the chamber or tank to the normal level of the sewage in the main line; the chamber or tank being in turn provided with a revolubly mounted agitator, as at C, whereby the entrapped sewage will be given rapid movement or agitation; in conjunction with means, as for example at D, whereby air will be forced downwardly through the agitator into the chamber or tank so that the air will be discharged into the agitated sewage beneath the surface thereof and caused to filter through the sewage toward the upper surface and upper end of the chamber or tank, from whence the air and entrained gases are discharged by means of an exhaust flue or vent, as at F, into the atmosphere at a higher altitude or at any predetermined point; the invention contemplating suitable power-imparting mechanism, as at E, whereby the air-forcing means and the agitating means may be operated.

My invention is especially intended for application in connection with the sewage in army camps where latrines are used, and in connection with the sewage pipes or lines of individual buildings or units; and in the specific adaptation of the invention as exemplified in the drawings, it consists in forming a sump section at any suitable point in the sewage line by employing a pair of straight pipe sections as at 1, 1, in Fig. 2, preferably of cast iron or any other suitable material, arranged in a vertical direction beneath the normal level of the main portion of the sewage line indicated at 5, 5. The vertical sections 1, 1 are each in turn connected with the adjacent portions of the main line 5, by means of suitable elbows indicated at 2, 2 which are secured to the adjacent portions of the main line and the upper ends of the vertically disposed pipes 1, 1, in any suitable manner to effect fluid-tight connections. At an intermediate point between the straight pipes or sections 1, 1 and in a lower horizontal plane than the lower ends of said straight pipes, I provide a T-connection 3 with the intermediate port disposed upwardly, while the ports at opposite ends are in turn connected with the lower ends of the straight pipes 1, 1 by means of a second set of elbow connections 2, 2 suitably connected to the straight pipes and the T-connection to effect fluid-tight joints. The upwardly disposed orifice 4 of the T-connection is adapted to form connection with the lower reduced open end of a suitable tank or chamber 6 which latter is preferably cylindrical as shown in Fig. 2. The lower reduced end is shown provided with a suitable flange whereby the tank may be firmly secured to the T-connection 3. The tank or chamber 6 is preferably of a size so as to extend into a horizontal plane above that of the main line 5; and the upper portion is provided with a removable end as at 7 in Fig. 2, which is shown offset and flanged so as to permit a comparatively tight closure or joint to be effected; the joint, however, being disposed in a plane above the normal level of the sewage. The end or cover section 7 is formed to provide a suitable housing for driving mechanism whereby an agitator, shown in the nature of a cylindrical tank 8, may be operated. The tank 8 has its walls provided with a plurality of perforations or openings as at 9; the perforations in the bottom and sides being adapted to admit the sewage which has entered the tank or chamber 6. The tank 8 is shown provided with a plurality of concentrically arranged partitions secured to the upper end of the tank and disposed downwardly to different depths; the partitions 10 being also perforated as shown. The upper end of the tank 8 is shown provided with a circular flange about which is disposed the downwardly extending tubular end or conduit portion of suitable housing which is secured to the inner or lower side of the cover end 7 of the tank or chamber 6. The tubular portion is adapted to effect more or less close contact with the circular flange on the upper end of the tank 8 while at the same time permitting tank 8, with the flange, to revolve through the action of a rotatable shaft 12 which has suitable bearing in the upper part of the housing secured to the cover end 7 of the tank or chamber 6 as well as in a suitable spider formation secured within the housing on the inner side of the cover member 7. By employing the spider formation, it is apparent that communication between the upper end of the housing and the tank or agitator 8 is established; the communication with the tank 8 being effected by means of perforations in the upper wall arranged concentrically within the upwardly disposed circular flange and therefore also within the tubular depending portion of the housing.

The shaft 12, at any suitable point, as for example above the spider formation just referred to, is provided with a suitable air fan or blower as at 11 whereby fresh air will be forced downwardly through the cylindrical depending portion of the housing, through the perforations in the upper end of the chamber 8, between the concentrically arranged partitions, and thence through the sewage in the tank 8 and out through the various perforations 9 in the sides and bottom of the tank 8.

The shaft 12 may be operated in any suitable manner, as for example by means of the bevel gear 16 secured to the shaft 12; the gear 16 in turn meshing with a bevel gear secured to the inner end of a drive-shaft 15 which extends through the side wall of the housing; with the outer end of the shaft 15 supported in any suitable manner. The drive-shaft 15 may be driven by any suitable mechanism, as for example a cone-pulley and belt as shown in Fig. 2, which enables the agitator 8 and the blower or fan 11 to be driven at varying speeds. The cover end 7 of the tank or chamber 6 is shown provided with an upwardly disposed vent or flue 13 which is adapted to communicate with the atmosphere at an elevation so as to readily convey the gases to a higher altitude.

As is evident from the construction shown and described, the sewage, coming we will assume from the left hand end of the construction as shown in Fig. 2, will flow into the tank or chamber 6 and rise to the level of the sewage in the main line 5 if of sufficient quantity; the heavier portions settling or remaining near the bottom of the tank or chamber 6 and its connection with the sump section until the mechanism is set in motion. Upon the accumulation of a sufficient quantity of sewage, the agitator and blower or fan are then put into operation by means of the drive shaft 15, causing the sewage within the tank or chamber 6 to be set in rapid motion and greatly agitated by the revolving tank or element 8. At the same time the sewage is being agitated, air will be forced downwardly into and through the agitator element or tank 8 by means of the blower or fan 11, thus causing an oxidation of the sewage whereby the foul and noxious gases will be forced upward, by means of the air filtering through the sewage, through the vent or flue 13. The entrapped sewage having thus been treated, the power to the mechanism may now be shut off and the purified sewage allowed to discharge from the chamber 6 out through the discharge end of the sewage line; the purified sewage to be replaced by the subsequent flow of foul sewage which is allowed to accumulate in the chamber 6, to be treated as before described.

Having thus described my invention, what I wish to secure by Letters Patent is:—

1. Means for purifying sewage, comprising a main sewage line provided with a sump section, a tank or chamber arranged in communication with said sump section, said tank or chamber being provided with an exhaust vent or flue, means revolubly mounted in said tank or chamber at a point below the normal sewage level and adapted to agitate the sewage, and means whereby air may be forced downwardly, through said first means and discharged into the agitated sewage.

2. Means for purifying sewage, comprising, in combination with a sewage line provided with a downwardly curved section, a tank connected at the bottom with the lowest point in said curved section to receive the sewage thereon, a hollow agitator revolubly mounted in said tank, said agitator being provided with a plurality of perforations, a fan or blower rotatably mounted in the upper end of said tank, means whereby the agitator and fan or blower may be revolved, means whereby the air currents produced by the fan or blower are directed into said agitator and discharged in a finely divided manner into the sewage, and a vent or flue whereby the rising gases in the tank are conveyed therefrom.

3. Means for purifying sewage, comprising, in combination with a sewage line, a tank interposed in said sewage line and disposed so as to extend into a horizontal plane above that occupied by the sewage line, a revolubly mounted agitator disposed substantially at the longitudinal center line in said tank, a fan or blower mounted in the upper end of said tank at a point above the normal sewage level, a housing disposed about said blower and arranged to convey the air currents downwardly into the sewage, and a vent or flue secured to the upper end of said tank for conveying the foul gases therefrom.

4. Means for purifying sewage, comprising, in combination with a sewage line, a vertically disposed tank interposed in said line so as to receive the sewage, the upper end of said tank being removable and provided with a housing, a portion whereof is disposed on the inner side of said removable end and terminates in a downwardly disposed conduit adapted to extend beneath the normal sewage level in the tank, a shaft rotatably mounted in said housing and disposed downwardly at the longitudinal center line of the tank, an agitator element secured to the lower end of said shaft beneath the downwardly disposed conduit portion of said housing, a fan or blower secured to said shaft within said housing above the normal sewage level in the tank, means whereby said shaft with the agitator element and fan or blower may be actuated, and means whereby the rising gases will be conveyed from the upper end of said tank.

JOHN P. BALL.

Witnesses:
  E. L. HIGGINS,
  G. A. HENSSEL.